United States Patent [19]

Fujikawa

[11] Patent Number: 4,762,429
[45] Date of Patent: Aug. 9, 1988

[54] ELECTRONIC CLINICAL THERMOMETER WITH A BATTERY LIFE WARNING DISPLAY

[75] Inventor: Toyoharu Fujikawa, Kawagoe, Japan

[73] Assignee: Citizen Watch Co., Ltd., Tokyo, Japan

[21] Appl. No.: 36,713

[22] Filed: Apr. 9, 1987

[30] Foreign Application Priority Data

Apr. 22, 1986 [JP] Japan ................ 61-093102

[51] Int. Cl.⁴ .................. G08B 21/00; G06F 3/14
[52] U.S. Cl. ................... 374/163; 340/756;
340/636; 368/66; 374/170
[58] Field of Search ............ 374/170, 124, 163, 208;
368/242, 66; 350/331 T; 340/636, 756, 753;
320/48, 43

[56] References Cited

U.S. PATENT DOCUMENTS

| | | | |
|---|---|---|---|
| Re. 29,637 | 5/1978 | Takamune et al. | 368/66 |
| 3,925,977 | 12/1975 | Maezawa | 340/756 X |
| 4,074,515 | 2/1978 | Asano | 368/66 |
| 4,203,103 | 5/1980 | Osada et al. | 340/636 X |
| 4,617,562 | 10/1986 | Klotz | 350/338 |
| 4,634,294 | 1/1987 | Christol et al. | 340/753 X |

Primary Examiner—Daniel M. Yasich
Attorney, Agent, or Firm—Koda and Androlia

[57] ABSTRACT

In an electronic clinical thermometer comprising a temperature oscillating circuit having a temperature sensor for detecting the body temperature; a body temperature measuring circuit for making data on the body temperature in response to an output signal of the temperature oscillating circuit; a digital display device having seven-segment digital patterns for displaying the body temperature in response to a signal of the body temperature measuring circuit; and a battery voltage detecting circuit for detecting a voltage drop of a battery, a first additional pattern and a second additional pattern are provided between two adjacent digital patterns of the digital display device and also an additional pattern decoder for driving the first and second additional patterns is provided, and the additional pattern decoder and decoders provided for driving the two digital patterns are controlled by an output signal of the battery voltage detecting circuit, whereby a battery life warning mark having the shape of the battery is displayed on the digital display device.

3 Claims, 5 Drawing Sheets

ELECTRONIC CLINICAL THERMOMETER WITH A BATTERY LIFE WARNING DISPLAY

BACKGROUND OF THE INVENTION

1. Field of the Invention

This invention relates to an electronic clinical thermometer for displaying the life of a battery by using part of the seven-segment digits on a digital display device.

2. Description of the Related Art

In recent years, instead of clinical thermometers made of glass containing mercury, electronic clinical thermometers have spread. The electronic clinical thermometer measures the body temperature by use of its temperature sensor and integrated circuit and displays the body temperature by the digital display device having display patterns of seven-segment digits.

The electronic clinical thermometer operates on a small bettery as a power source. When the voltage of the battery is reduced below a predetermined value, the operation of the temperature measuring circuit becomes unstable, which leads to errors in measurement. Accordingly, a battery voltage detecting circuit is provided for detecting the voltage drop of the battery, and corresponding to a detecting signal of the battery voltage detecting circuit, a battery life warning display is provided so as to assure the reliability of the electronic clinical thermometer.

Now, the basic arrangement of the electronic clinical thermometer and some examples of conventional battery life warning displays will be explained.

FIG. 1 is a block diagram showing the basic arrangement of an electronic clinical thermometer with a battery life warning display. This basic arrangement has been used conventionally and also is used in the present invention. 101 is a reference oscillation circuit for oscillating a reference signal $f_o$ which does not vary with time and for sending the reference signal $f_o$ to a control signal generating part 103. The control signal generating part 103 receives the reference signal $f_o$ and sends a variety of control signals such as a gate signal $\phi_g$, a latch signal $\phi_B$ and a sampling signal $\phi_s$. 102 is a temperature oscillation circuit. This temperature oscillation circuit 102 incorporates a temperature detecting sensor and oscillates a temperature sensor signal $f_t$ whose frequency varies with the body temperature. 104 is a control part which is on or off in response to the gate signal $\phi_g$ of the control signal generating part 103 and sends the temperature sensor signal $f_t$, which has applied while the control part 104 is on, as a temperature measuring signal $\phi_A$. 120 is a body temperature measuring circuit comprising a counter part 105, a memory part 106 and a decoder part 109. The temperature measuring circuit 120 works as follows: The counter part 105 counts the temperature measuring signal $\phi_A$ and sends a temperature information signal $D_t$ to the memory part 106. The memory part 106, in turn, compares the temperature information signal $D_t$ which has newly been applied from the counter part 105 with a maximum temperature information signal $D_m$ which has already been stored in the memory part 106 corresponding to the latch signal $\phi_B$, and the memory part 106 stores the higher temperature information as the maximum temperature information signal $D_m$, thus continuing to update the information on the maximum temperature which rises with the lapse of time during the temperature measurement. The maximum temperature information signal $D_m$ which varies momentarily as above is decoded into a display signal $D_d$ of seven segments by the decoder part 109 and displayed numerically in seven-segment patterns on a digital display part 110. On the other hand, 107 is a battery voltage detecting circuit. A detection level is predetermined by an external resistance 108. When the battery voltage detecting circuit 107 detects the fact that the battery voltage is reduced below the predetermined detection level, it produces a battery life warning signal $\phi_C$ and applies it to the decoder part 109 of the temperature measuring circuit 120. As a result, the decoder part 109 produces a warning display signal $D_d$ for indicating a battery life warning mark on the digital display part 110.

FIG. 2 is a plan view of a conventional digital display device 110 with a battery life warning mark, in which 110A denotes a ten degree (10°) digit of the measured temperature value; 110B denotes a one degree (1°) digit; 110C denotes a decimal point; 110D denotes a point one degree (0.1°) digit; 110E denotes a unit; and 110F is a display pattern showing a battery life warning mark. The digital patterns 110A, 110B and 110D comprise well known seven-segment patterns, and the battery life warning mark 110F has a small pattern of the shape of a battery. Usually, the maximum temperature information corresponding to the display signal $D_d$ applied by the body temperature measuring circuit 120 is displayed on the seven-segment patterns of the digital display device 110, and the battery life warning mark 110F is not lit. However, when the battery voltage is reduced below the detection level and thus the battery life approaches an end, the battery life warning signal $\phi_C$ is produced and the battery life warning mark 110F is lit to urge the user to replace the battery.

Now, the operation of the battery life warning of the electronic clinical thermometer has been discussed.

To take other conventional examples of the battery life warning displays each provided on the display part of the electronic digital clinical thermometer, as disclosed in U.S. Pat. Re. 29,637, there is an alphabetic pattern of "BAT" which reminds the user of its battery and as disclosed in U.S. Pat. No. 4,074,515, there is a seven-segment pattern display which changes the color.

Still, the object of the battery life warning display is to notify the user of the necessity for the replacement of the battery. It means that unless the battery is replaced, the correct measurement could not be made any more. Therefore, the result of the battery voltage detection is the highly important information. Nevertheless, in view of the shape of the typical electronic thermometer, the digital display device 110 is limited to about 20 mm in overall length and about 6 mm in width. On such small display surface area, there are provided some display patterns such as a plurality of seven-segment patterns, a decimal point and a unit mark, and therefore the battery life warning mark provided on the limited space should become a very small shape. Thus the conventional mark fails to perform the function of warning.

Also, as in U.S. Pat. No. 4,074,515, a battery life warning display which changes the color of the seven-segment patterns can perform the proper function of warning because of its large-sized segment patterns. However, since the color changing digital display must be used, the cost is raised and such display cannot be used for low-cost electronic thermometers.

SUMMARY OF THE INVENTION

The objects of the invention is to solve the above conventional problems and provide an electronic clinical thermometer with an easily recognizable battery life warning display without raising the cost. To attain the above objects, according to the invention, there is provided an electronic clinical thermometer comprising a temperature oscillating circuit having a temperature sensor for detecting the body temperature; a body temperature measuring circuit for making data on the body temperature in response to an output signal of the temperature oscillating circuit; a digital display device having seven-segment digital patterns for displaying the body temperature in response to a signal of the body temperature measuring circuit; and a battery voltage detecting circuit for detecting a voltage drop of a battery, characterized in that a first additional pattern and a second additional pattern are provided between two adjacent digital patterns and also an additional pattern decoder for driving the first and second additional patterns is provided, and that the additional pattern decoder and decoders provided for driving the two digital patterns are controlled by an output signal of the battery voltage detecting circuit, whereby a battery life warning mark having the shape of the battery is displayed on the digital display device.

DETAILED DESCRIPTION OF THE PREFERRED EMBODIMENT

Figure 3:
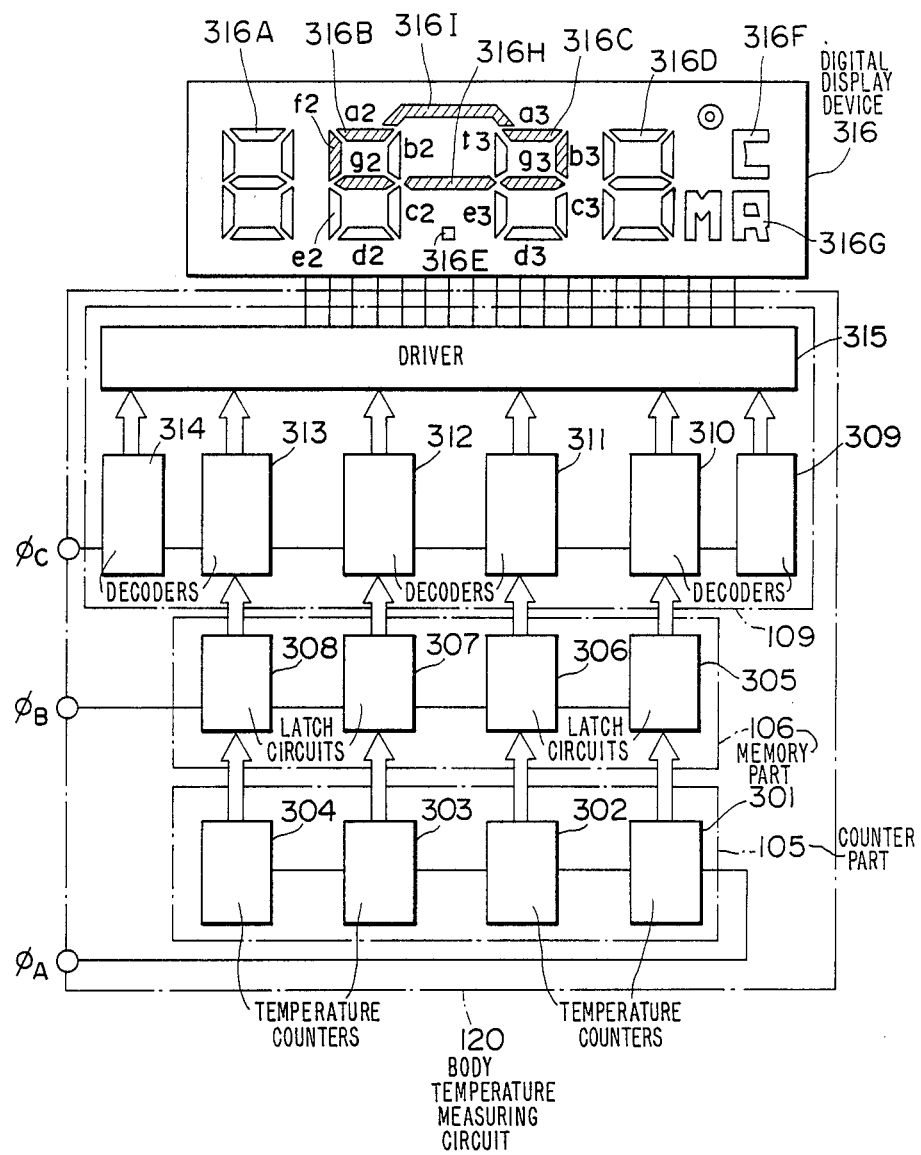
FIG. 3 is a block diagram of a circuit for measuring the body temperature and a front view of a display device of an electronic clinical thermometer of the present invention.

Embodiments of the present invention will now be described with reference to the accompanying drawings:

FIG. 3 is a structural view of a temperature display system of an electronic clinical thermometer showing an embodiment of the invention. Specifically, the arrangement of the body temperature measuring circuit 120 and a digital display device 316 is shown. In this figure, 301, 302, 303 and 304 denote temperature counters and form the counter part 105 of FIG. 1. 301 is a decimal temperature counter for a 1/100° digit, 302 for a 1/10° digit; 303 for a 1° digit and 304 for a 10° digit. These counters count the number of output pulses of the temperature measuring signal $\phi_A$.

Figure 1:
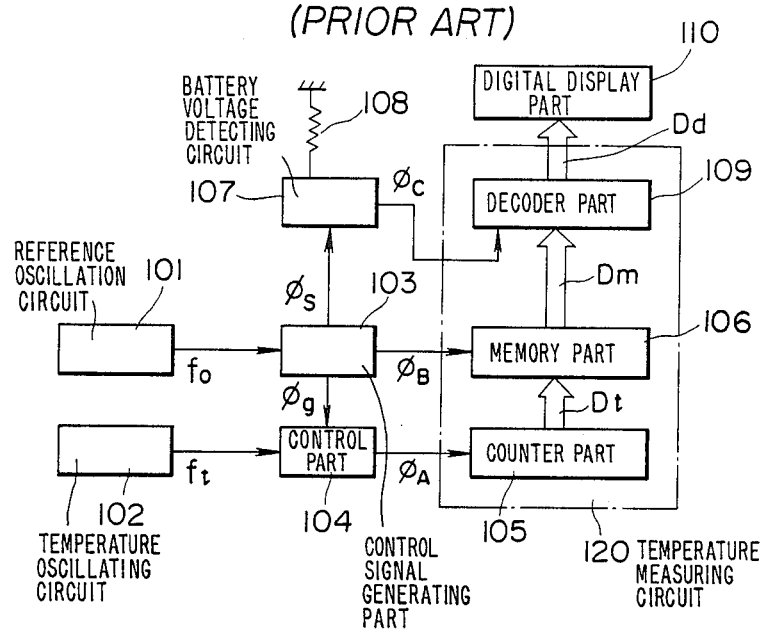
FIG. 1 is a block diagram of an electronic clinical thermometer used in prior art and the present invention.
Figure 2:
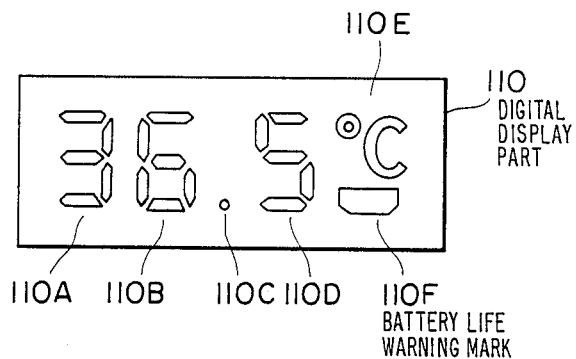
FIG. 2 is a front view of a digital display device of a conventional electronic clinical thermometer.

305, 306, 307 and 308 are latch circuits and form the memory part 106 of FIG. 1. 305 is a latch circuit for the 1/100° digit, 306 for the 1/10° digit, 307 for the 1° digit and 308 for the 10° digit. These latch circuits temporarily store the result obtained by the temperature counters 301 to 304. Latch signal $\phi_B$ updates the data.

309, 310, 311, 312, 313 and 314 are decoders, in which 309 is a decoder for a decimal mark, a unit mark, or the like, 310 for the 1/100° digit, 311 for the 1/10° digit, 312 for the 1° digit, 313 for the 10° digit, and 314 for additional patterns. 315 is a driver for driving the digital display device 316 in response to the output signals of the decoders 309 to 314. The decoders 309 to 314 and the driver 315 form the decoder part 109 of FIG. 1.

The digital display device 316 comprises seven-segment digital patterns 316A, 316B, 316C and 316D; a decimal pattern 316E; and a first additional pattern 316H and a second additional pattern 316I for forming part of a battery life warning mark.

In the above arrangement, during an ordinary operation in which the battery life warning signal $\phi_C$ is not applied to the decoder part 109 (state in which the battery voltage is not reduced), the decoders 309 to 313 are in their ordinary mode and only the decoder 114 is in its nonoperating mode. In this state, the output signals of the decoder 309 continuously display the decimal pattern 316E and the unit mark 316F and drivably display the memory mark 316G. The output signal of the decoder 310 drivably displays the digital pattern 316D in the 1/100° C. place, the output signal of the decoder 311 drivably displays the digital pattern 316C in the 1/10° place, the output signal of the decoder 312 drivably displays the digital pattern 316B in the 1° C. place, and the output signal of the decoder 313 drivably displays the digital pattern 316A in the 10° C. place. On the other hand, the decoder 314 in the non-operating mode keeps the first additional patern 316H and the second additional pattern 316I in their non-operating state.

The above description shows an ordinary temperature display state. Next, the operation of the battery life warning display will be explained.

When the battery voltage detecting circuit 107 shown in FIG. 1 detects the drop of the battery voltage and applies the battery life warning signal $\phi_C$ to the decoder part 109, the decoders 309, 310 and 313 become their non-operating state and hence the decimal pattern 316E, the unit mark 316F, the memory mark 316G, digital patterns 316D and 316A become their non-operating state. Also, the decoders 311 and 312 are in their specific mode selecting state, and on the display device 316, as shown in slant lines, only segments a2, f2 and g2 of the digital pattern 316B and segments a3, b3 and g3 of the digital pattern 316C are in their display state. In addition, the decoder 314 becomes the operating mode to make the first additional pattern 316H and the second additional pattern 316I be in the display state as shown in slant lines. The combination of the patterns in the display state forms a battery life warning mark with the shape of a battery, thus enabling the user to recognize the replacement time of the battery.

Next, the shape of the battery life warning mark will be explained.

The button-shaped battery used in electronic clinical thermometers or the like is provided with an annode part having the shape of a thin disc and a convex cathode part in the middle of the annode part. In order to provide a battery life warning mark which is very similar to the shape of the button-shaped battery, the upper segment a2, the outside vertical segment f2 and the middle segment g2 of the digital pattern 316B, and the upper segment a3, the outside vertical segment b3 and the middle segment g3 of the digital pattern 316C are used to form part of the disc-shaped anode part, and between the middle segments g2 and g3 of both digital patterns 316B and 316C, the first additional pattern 316H at the same level with segments g2 and g3 is provided to form part of the bottom of the battery. Furthermore, between the upper segments a2 and a3 of both digital patterns 316B and 316C, the second additional pattern 316I is provided in a higher position than the segments a2 and a3 to form the convex cathode part. In this respect, the second additional pattern 316I is longer than the first additional pattern 316H and both ends of the second additional pattern 316I are bent and the bent portions approach the segments a2 and a3, respectively. Thus the mark is very similar to the shape of the button-shaped battery.

In this embodiment, the two digital patterns 316B and 316C sandwiching the decimal pattern 316E are used as the two-place digital patterns for forming the battery life warning mark. This is because the use of the two sufficiently spaced digital patterns can form the shape of the battery life warning mark as large as possible. However, this invention is not limited to this embodiment, and any combination of the two adjacent digital patterns such as 316A and 316B, and 316C and 316D can be used.

Figure 4:
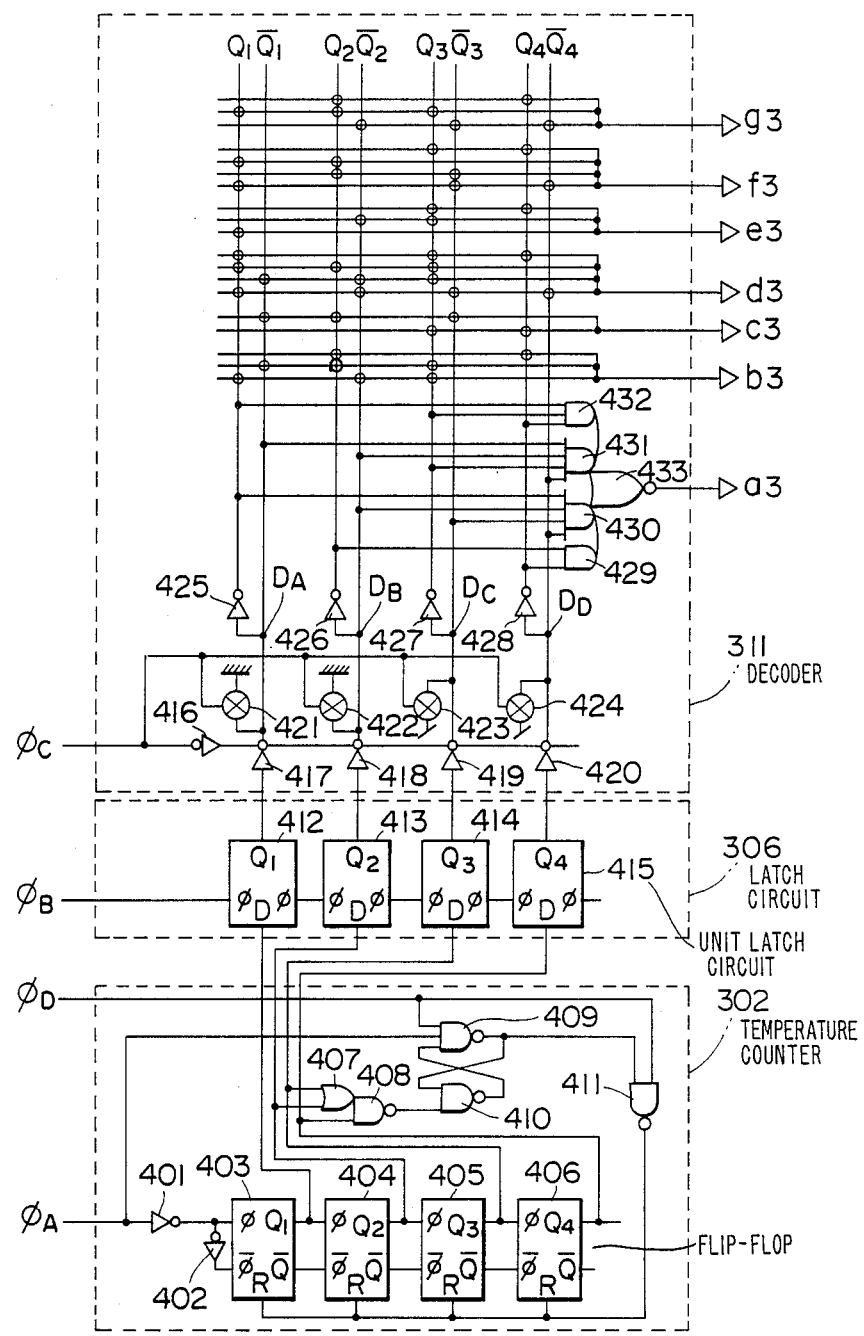
FIG. 4 is a detail view of blocks 302, 306 and 311 of FIG. 3.

FIG. 4 is a detail view of a circuit block arrangement especially concerning the 1/10° place according to the present invention.

In the figure, 302 is the counter part 105 shown in FIG. 1. 401 and 402 are inverter gates, 403, 404, 405 and 406 are flip-flops (hereinafter referrred to as F/Fs), 407 is an OR gate, and 408, 409, 410 and 411 are NAND gates. These devices form a decimal counter. The temperature measuring pulse $\phi_A$ makes F/Fs 403 to 406 step forward. When the output Q of F/F 406 is "1", and the output Q of F/F 405 or the output Q of F/F 404 is "1", the output of NAND gate 408 is "0" and the output of NAND gate 410 is "1". When the temperature measuring signal $\phi_A$ and the signal $\phi_D$ are "1's", the output of NAND gate 409 is "0" and the output of NAND gate 411 is "1". Then F/Fs 403 to 406 are reset and all the outputs of F/Fs are "0's". Thus the decimal counter is formed.

In FIG. 4, 306 is a latch circuit part corresponding to the memory part 106 shown in FIG. 1. 412, 413, 414 and 415 are unit latch circuits. These unit latch circuits 412 to 415 are updated by the latch signal $\phi_B$, and, for example, the maximum temperature among the measured temperatures is stored.

TABLE 1

| Displayed value | Content | $Q_4$ | $Q_3$ | $Q_2$ | $Q_1$ |
|---|---|---|---|---|---|
| 0 | Numerical data | 0 | 0 | 0 | 0 |
| 1 | " | 0 | 0 | 0 | 1 |
| 2 | " | 0 | 0 | 1 | 0 |
| 3 | " | 0 | 0 | 1 | 1 |
| 4 | " | 0 | 1 | 0 | 0 |
| 5 | " | 0 | 1 | 0 | 1 |
| 6 | " | 0 | 1 | 1 | 0 |
| 7 | " | 0 | 1 | 1 | 1 |
| 8 | " | 1 | 0 | 0 | 0 |
| 9 | " | 1 | 0 | 0 | 1 |
| | | 1 | 0 | 1 | 0 |
| | | 1 | 0 | 1 | 1 |
| Battery voltage detection | | 1 | 1 | 0 | 0 |
| | | 1 | 1 | 0 | 1 |
| | | 1 | 1 | 1 | 0 |

TABLE 1-continued

| Displayed value | Content | $Q_4$ | $Q_3$ | $Q_2$ | $Q_1$ |
|---|---|---|---|---|---|
| | | 1 | 1 | 1 | 1 |

In FIG. 4, 311 is the decoder part 109 shown in FIG. 1. 416 to 420 and 425 to 428 are inverter gates, 421 to 424 are switches, 429 to 432 are AND gates, and 433 is a NOR gate. When the battery life warning signal $\phi_C$ switches from "0" to "1", the outputs of the clocked inverters 417 to 420 become high impedance. And the temperature data counted by the counter part 302 and temporarily stored in the latch circuit part 306 are not transferred. Simultaneously, switches 421 to 424 permit $D_A$ and $D_B$ to be "1's", and $D_C$ and $D_D$ to be "0's". Thus, as shown in Table 1, $D_A$ to $D_D$ have not only numerical display codes of 0 to 9 but also battery life warning mark codes by the battery life warning signal $\phi_C$ for providing each display.

AND gate 429 is "1" when both $D_B$ and $D_D$ are "0's"; AND gate 430 is "1" when $D_B$, $D_C$ and $D_D$ are "1's" and $D_A$ is "0"; AND gate 431 is "1" when $D_A$, $D_B$ and $D_D$ are "0's" and $D_C$ is "0"; AND gate 432 is "1" when $D_A$, $D_C$ and $D_D$ are "0's"; NOR gate 433 is "0" when any of AND gates 429 to 432 is "1", and segment a3 of the digital pattern 316C (FIG. 3) is not lit. Similarly, segments b3, c3, d3, e3, f3 and g3 are equipped to display selectively either one of the numerical data of the measured temperature or the battery life warning mark.

Figure 5:
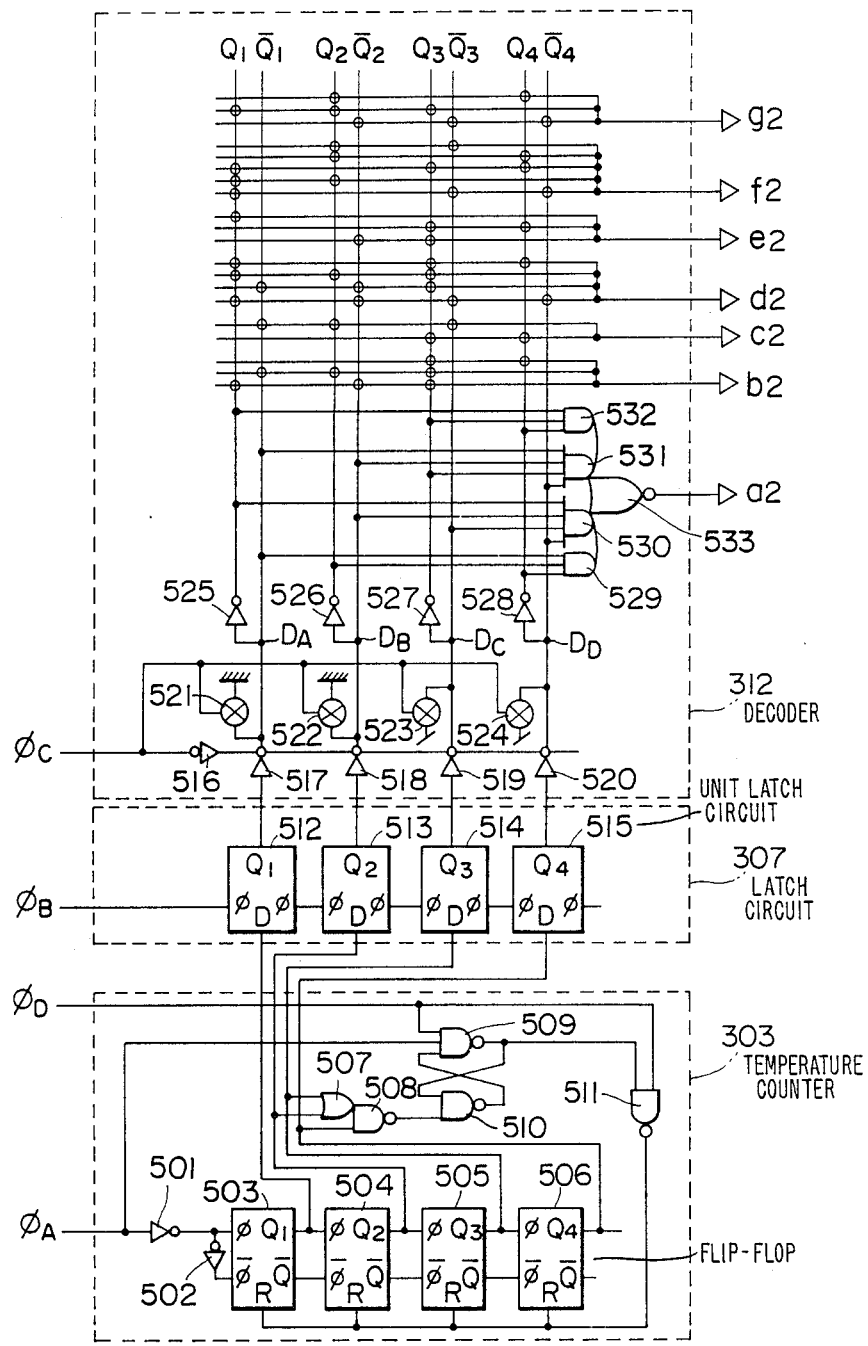
FIG. 5 is a detail view of blocks 303, 307 and 312 of FIG. 3.

FIG. 5 is a detail view showing a circuit block concerning the 1° place of the present invention. A counter 303 comprising inverter gates 501 and 502, F/Fs 503 to 506, an OR gate 507, NAND gates 508 to 511 is the same as the counter 302 of FIG. 4. A latch circuit 307 comprising F/Fs 512 to 515 is the same as the latch circuit 306 of FIG. 4. Also, inverter gates 516 to 520, and 525 to 528, and switches 521 to 524 in the decoder 312 are the same as the decoder 311 of FIG. 4. However, the combination circuit of FIG. 5 forming segments a2, b2, c2, d2, e2, f2 and g2 by use of the combination of the outputs of the latch circuit $Q_1$, $\overline{Q}_1$, $Q_2$, $\overline{Q}_2$, $Q_3$, $\overline{Q}_3$, $Q_4$ and $\overline{Q}_4$ is different from the circuit of FIG. 4 forming a3, b3, c3, d3, e3, f3 and g3. For example, a2 formed by AND gates 529 to 532 and NOR gate 533 is:

$$a2=\overline{Q_1.Q_3.Q_4+Q_1.Q_2.Q_3.Q_4+Q_1.Q_2.Q_3.Q_4+Q_1.Q_2.Q_4}$$

Also, for example, f2 and g2 are:

$$f2=\overline{Q_2.Q_3+Q_2.Q_4+Q_1.Q_3.Q_4+Q_1.Q_2+.Q_1.Q_3.Q_4}$$

$$g2=\overline{Q_2.Q_4+Q_1.Q_2.Q_3+Q_2.Q_3.Q_4}$$

Therefore, in the ordinary mode, segments a2 to g2 are combined to display one of digits 0 to 9 of Table 1, but when the battery life warning signal $\phi_C$ switches from 0 to 1, $Q_1=Q_2=0$ and $Q_3=Q_4=1$. Thus only segments a2, f2 and g2 are lit, and none of segments b2, c2, d2 and e2 are lit.

Figure 6:
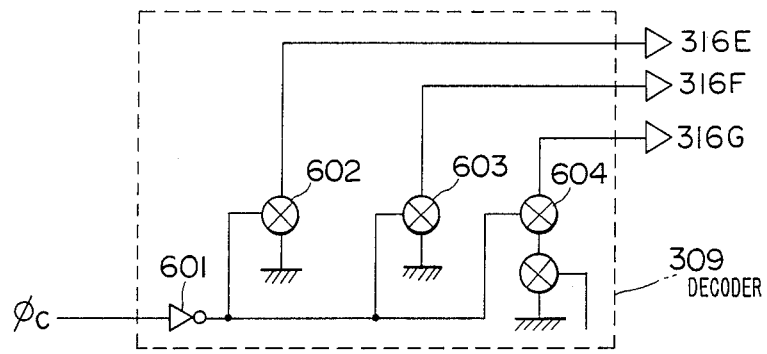
FIG. 6 is a detail view of block 309 of FIG. 3.

FIG. 6 is a detail view of the inside of the decoder 309. In the ordinary mode, $\phi_C=0$, and switches 602, 603 and 604 are conducting through an inverter 601. Since voltage "1" (earth) is applied to segments 316E, 316F and 316G, the decimal pattern 316E, the unit mark 316F and the memory mark 316G are kept driven.

However, when the battery life warning signal $\phi_C$ switches from 0 to 1, switches 602 to 604 are cut off and these marks are off.

Figure 7:
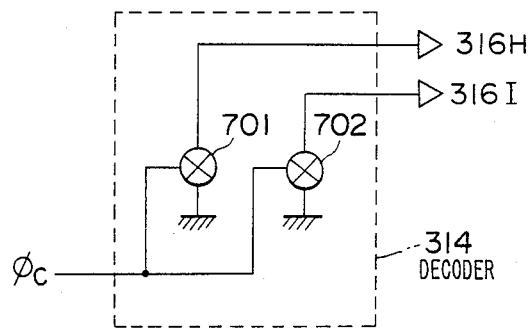
FIG. 7 is a detail view of block 314 of FIG. 3.

FIG. 7 is a detail view of the inside of the decoder 314 for the additional patterns. In the ordinary mode, since $\phi_C=0$ and switches 701 and 702 are blocked, no voltage is applied to the additional patterns 316H and 316I. However, when $\phi_C$ switches from 0 to 1, switches 701 and 702 are conducting, voltage "1" is applied to 316H and 316I, and these additional patterns are lit.

Figure 8:
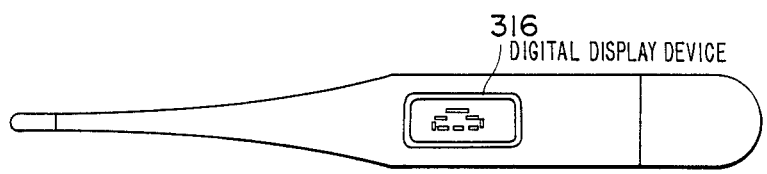
FIG. 8 is an exterior view of the electronic clinical thermometer using the display device of the present invention.

Also, as for the decoder 310 for the 1/100° place and the decoder 313 for the 10° place, when $\phi_C$ switches from 0 to 1, the voltage applied to the segments 316D and 316A by the respective switches (not shown) is cut off and the segments are off, but since the details have been discussed in the above description, a further explanation will be omitted herein. As detailed in the above, in the ordinary condition of use, the body temperature is displayed on the display part 316, but when the battery life warning signal is produced, as shown in FIG. 8, the large battery display mark is indicated on the display part 316.

As mentioned above, according to the present invention, only by providing two additional patterns, the specific segments in two-place digital patterns allow the display of a large battery life warning mark similar to the shape of a button-shaped battery. Therefore, the information concerning the battery voltage drop condition which is very important for electronic clinical thermometers is given especially without increasing the shape of the digital display device, and the easily recognizable display can be realized.

What is claimed is:

1. An electronic clinical thermometer comprising:
    a temperature oscillating circuit having a temperature sensor for detecting a body temperature;
    a body temperature measuring circuit for making data on the body temperature in response to an output signal of the oscillating circuit;
    a battery voltage detecting circuit for detection a voltage drop of a battery;
    a digital display device having:
        a plurality of seven segment digital patterns for displaying the body temperature in response to a signal of the body temperature measuring circuit;
        a first additional pattern formed between middle segments of two adjacent digital patterns; and
        a second additional pattern formed between upper segments of the two adjacent digital patterns of said plurality of seven segment digital patterns; and
    an additional pattern decoder for driving the first and second additional patterns and being controlled by an output signal of the battery voltage detecting circuit so as to selectively display one of the body temperature and a battery condition;
    said middle segments, upper segments and outside segments of the two adjacent digital patterns of said plurality of seven segment digital patterns and said first and second additional patterns being capable of constituting a battery life warning mark having the shape of a battery;
    whereby only the battery life warning mark is display on the digital display device when the voltage drop of the battery is detected by the battery voltage detecting circuit.

2. An electronic clinical thermometer according to claim 1, wherein said second additional pattern is longer in shape han the first additional pattern.

3. An additional clinical thermometer according to claim 1, wherein both ends of the second additional pattern are bent so as to approach the respective upper segments of the two adjacent digital patterns.

* * * * *